3,366,958
PROXIMITY INDICATOR
Elizabeth M. Seaborn, 926 Warfield Way,
Richardson, Tex. 75080
Filed Oct. 22, 1965, Ser. No. 502,030
6 Claims. (Cl. 343—112)

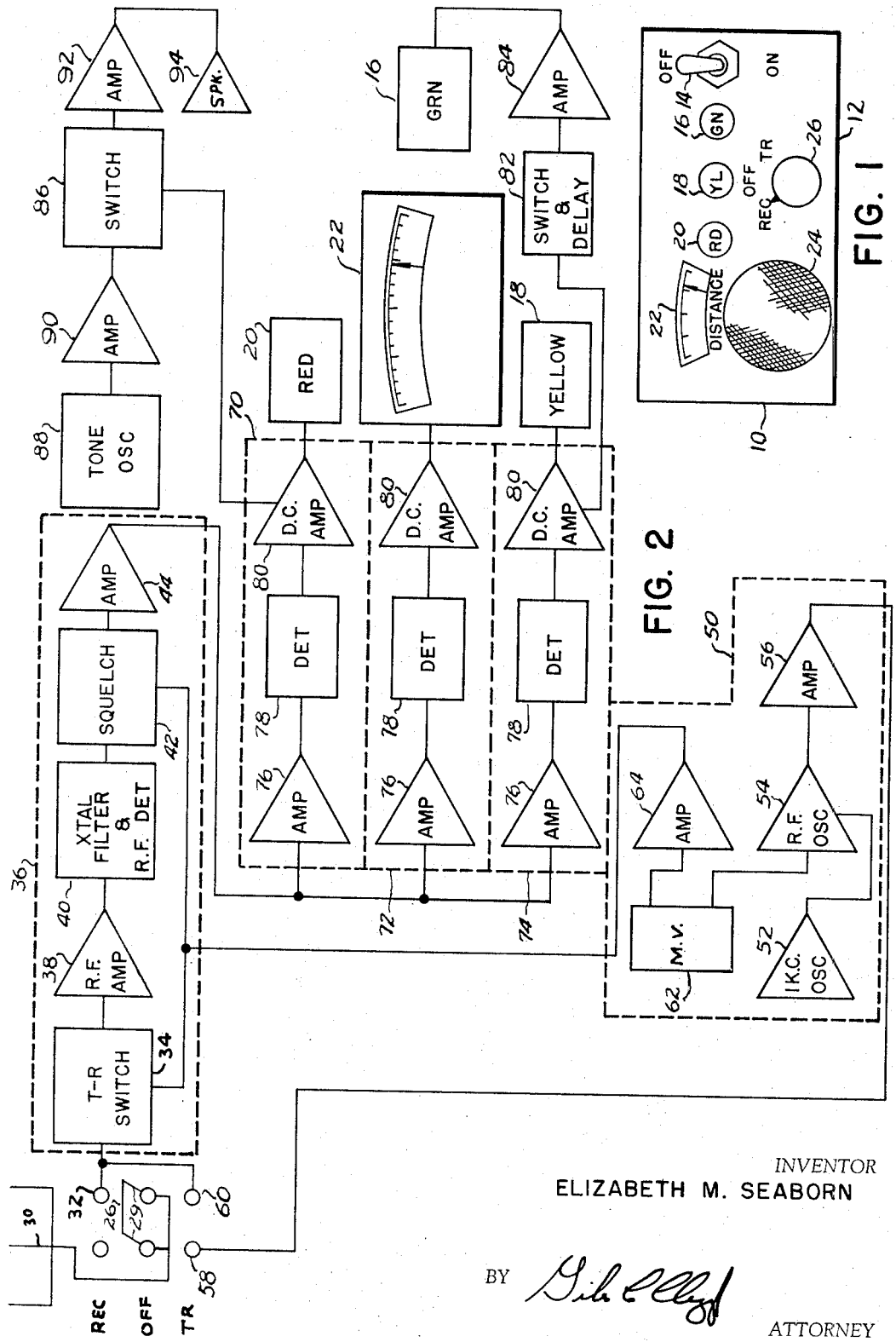

ABSTRACT OF THE DISCLOSURE

There is disclosed in the specification and drawings a signaling system for indicating that two spaced apart mobile units are within the vicinity of one another. Each of the mobile units carries a signaling device which includes a transmitter for transmitting signals of a constant power level and selected frequency and a receiver for receiving signals of the selected frequency and providing an output signal whose energy varies as a function of the energy of the received signal. There is also provided means responsive to the level of energy of selected frequency received by the receiver for indicating the proximity of one unit to the other unit.

---

The invention has a special application with regard to vehicles traveling under emergency conditions, but also finds application in other instances in which it may be desirable to provide an indication that two units equipped with the apparatus of the present invention are in the vicinity of one another. For example, the system of the present invention can be utilized for the purpose of avoiding collisions between ships operating at night or in fog, or aircraft in flight.

As indicated above, the present invention is specially adapted for warning one vehicle traveling under emergency conditions of the approach of another vehicle traveling under emergency conditions. By vehicles traveling under emergency conditions it is particularly meant police patrol cars, fire trucks, ambulances, and other vehicles which on occasion travel with their sirens on and depend upon the presence of their sirens and flashing lights to warn other traffic of their approach and to grant them right of way. However, if two such vehicles approach an intersection at the same time, the sound of one siren will prevent the operators of the one vehicle hearing the siren of the other vehicle.

The many accidents resulting from failure of one emergency vehicle to be aware of the approach of another emergency vehicle has been cause for considerable concern and many systems have been devised for preventing the occurrence of these accidents. For example, many emergency vehicles are presently equipped with sirens which do not produce a signal of substantially constant intensity but rather a siren is designed such that it will produce beats of noise with short periods between the beats in which another siren can be heard. Further, many cities now maintain an organization in which contact is continuously maintained with vehicles traveling under emergency conditions for the purpose of warning vehicles any time two vehicles traveling under emergency conditions are in the same vicinity. Still other types of systems have been directed toward electronic apparatus in which vehicles traveling under emergency conditions can transmit radio waves. These radio waves can either be received by other similarly equipped vehicles or, in other systems, radio waves are utilized for the purpose of operating traffic signals.

The present invention provides an improved signaling system wherein an indication is provided of the proximity of a second vehicle traveling under emergency conditions, and wherein suitably different indications are provided dependent upon the degree of danger. Further, in accordance with the preferred embodiment of the invention, a meter is provided for directly indicating the distance to the second vehicle and an audible warning sound device is actuated when the two vehicles become dangerously close.

In accordance with the principles of the present invention, at least one and preferably both vehicles are equipped with a transmitter for transmitting pulses of magnetic energy at a constant power level. Preferably, the transmitter has a relatively low duty cycle to permit a long listening period between pulses. Also, the other and preferably both of the vehicles are equipped with a receiver for receiving energy transmitted by the transmitter of any other vehicle and means responsive to the level of energy received by the receiver for indicating the proximity of one unit to the second unit. It will be noted that by maintaining the transmission of power constant, it is possible to obtain a sufficiently precise indication of the proximity of the two vehicles to provide the desired warning and indicating capability as a function of the power received.

In accordance with the preferred embodiment of the invention, three lamps are provided, one being colored green, one being colored yellow and one being colored red. In the event signals are not received at a level to indicate the presence of a vehicle traveling under emergency conditions, the green lamp will be energized. The yellow lamp is powered by one amplifier whose input is connected to the output of the receiver and the red lamp is powered by yet a second amplifier whose input is also connected to the output of the receiver. The gain of the amplifier supplying power to the yellow lamp is substantially greater than that of the amplifier supplying power to the red circuit such that when the received signals are of a relatively low power level, the yellow lamp will be energized, but the received signals must be of substantially higher power level to cause the red lamp to be energized. There is also preferably provided circuitry to cause the green lamp to become de-energized when the yellow lamp becomes energized and circuitry for actuating an audible warning system whenever the red lamp is energized. Further, in accordance with the preferred embodiment of the invention, there is provided still a third amplifier whose input is connected to the output of the receiver, the output of the third amplifier being connected to drive a meter that is calibrated to indicate the distance of another vehicle traveling under emergency conditions.

Many objects and advantages of the invention will become apparent to those skilled in the art as the following detailed description of a preferred embodiment of the invention unfolds when taken in conjunction with the appended drawings wherein like reference numerals denote like parts and in which:

FIGURE 1 is a front elevation view illustrating a panel useful with the apparatus of the present invention; and FIGURE 2 is a block diagram illustrating the preferred embodiment of a signaling system in accordance with the present invention.

Turning now to FIGURE 1 of the drawings, the apparatus of the present invention is denoted generally by the reference character 10. All of the controls and indicators are suitably positioned on a single panel 12. Thus, there is provided a switch 14 which is connected for applying power to the system. Positioned on the front of the panel are three lamps 16, 18 and 20, which are suitably green, yellow and red, respectively. The color of the lamps which are lit indicate the degree of caution that should be exercised as a function of the proximity of two other vehicles traveling under emergency conditions. The panel 12 is also suitably equipped with a meter 22 that is calibrated to indicate the distance of another vehicle traveling under emergency conditions in suitable units of distance. Thus, the meter 22 can be calibrated in terms of feet, yards, blocks or miles. Positioned behind the grill 24 is a speaker (not shown) which is suitably operated upon the red lamp 20 becoming energized to provide an audible warning that the second vehicle traveling under emergency conditions is in the immediate vicinity. There is also preferably provided a function switch 26 settable to one of three positions indicated as REC, OFF and TR. When the function switch 26 is in the OFF position, the system will neither transmit nor receive signals. If the function switch 26 is in the REC position, the system will not transmit signals indicating that that particular vehicle is traveling under emergency conditions, but the receiver will be free to receive signals transmitted by a second vehicle and provide indication of danger. When the vehicle is traveling under emergency conditions, the function switch 26 will be placed in the TR position in which radio waves will be transmitted and in signals will be received, if present. If desired, the siren can be connected through switch 26 to activate the siren when the position TR.

Turning now to FIGURE 2 of the drawings, the preferred embodiment of the system of the present invention is shown in block diagram form. Schematic diagrams of the individual circuits will not be shown since each of the circuits are suitably of conventional types well known in the art.

In the form shown, the function switch is suitably of the double pole, double throw type in which both poles 29 are connected to the input of the antenna 30. It will be noted that, in the form shown, the two poles are electrically connected. The contact 32 of switch 26 is connected to a transmit-receive switch 34 of conventional design. Thus, when switch 26 is in the REC position, one of the poles 29 contacts the contact 32, and energy received by the antenna 30 will only be applied to the input of the transmit-receive switch 34 and the transmitter 50 will not be connected to the antenna.

The receiver of the present invention is designed generally by the reference character 36 and includes the transmit-receive switch 34 which is connected to the input of a radio frequency amplifier 38. The output of the radio frequency amplifier 38 is applied to a conventional crystal filter and RF detector 40 whose output is in turn applied through a squelching circuit 42 to the input of amplifier 44. The amplifier 44 comprises the last stage of the receiver 36.

The transmitter, designated generally by the reference character 50, can be seen to comprise a 1 kilocycle oscillator 52 whose output is applied to radio frequency oscillator 54. The output of the RF oscillator 54 is applied through amplifier 56 to contact 58 of switch 26. Contact 60 of switch 26 is connected to the input to the TR switch 34. As a result of the above connection, when the switch 26 is in the TR position, the antenna 30 will be connected to both the transmitter 50 and the receiver 36.

The transmitter 50 also includes free running multivibrator 62 having one output connected to the RF oscillator 54 and the other output connected through amplifier 64 to the T-R switch 34 and the squelch circuit 42 of the receiver 36. The multivibrator 62 is of conventional design wherein two series of pulses are produced, a pulse of one of the two series always being present but pulses not being simultaneously present in the two series. The two outputs of the multivibrator 62 control the operation of the transmitter and receiver such that when the RF oscillator 54 is operated to apply through amplifier 56 energy to the antenna 30, a signal will be applied to the transmit-recieve switch 34 to prevent transmitted energy being applied to the crystal filter and detector circuit and also a squelching signal will be applied to prevent any possibility of the transmitted signal producing erroneous indications. Thereafter, when the multivibrator 62 changes its state, a signal will be applied to disable the oscillator 54, preventing energy being transmitted and to permit the T-R switch 34 to apply received signals to the crystal filter and RF detector.

The output of the receiver 36 is applied to the inputs of three amplifier circuits 70, 72 and 74, each of which include an amplifier 76, a detector 78 and a DC amplifier 80. The output of the amplifier 70 is applied to energize the red indicator 20, the output of the amplifier 72 is applied to drive the meter 22, and the output of amplifier 74 is applied to energize the yellow indicator 18. The gain of the amplifying circuit 72 is established in conjunction with the characteristics of the meter 22 such that the meter 22 will indicate directly the distance of the vehicles transmitting the signals that are received.

The gain of the amplifier 74 is substantially higher than that of amplifier circuit 70. In view of the difference in gain of the two amplifiers, the signals received must be of substantially higher power level, indicating closer proximity of the transmitting vehicle, to cause the red lamp 20 to be lit than to cause the yellow lamp 18 to be energized.

The green lamp 16 is energized at all times that the power is applied to the system and the yellow lamp 18 is not energized. However, upon the yellow lamp 18 becoming energized, power is applied from amplifier 80 through a switch and delay circuit 82 to amplifier 84 which powers the green lamp 16 to disable the amplifier 84 and prevent the green lamp 16 being energized.

The output of the amplifier 70 which supplies power to the red lamp 20 is also applied to operate a switch 86. The switch 86 is connected in circuit with a tone oscillator 88 whose output is applied through amplifier 90 to one side of switch 86, the other side of switch 86 being applied through amplifier 92 to speaker 94. Tone oscillator 88 continuously provides an output to amplifier 90 when switch 14 is in the ON position. Switch 86, however, prevents the output of amplifier 90 being applied through amplifier 92 to the loud speaker 94, positioned behind the grill 24 of FIGURE 1. However, responsive to the level of the received signals becoming sufficiently high to cause the red lamp 20 to be energized, a signal is applied from amplifier 70 to cause switch 86 to permit the signals generated by the tone oscillator to be applied to the speaker 94 for producing an audible warning that a second vehicle traveling under emergncy conditions is dangerously near.

It will be readily appreciated that other means, such as various types of integrating networks, can be utilized for providing different indications responsive to the energy level of signals received by the receiver 36. However, the system disclosed has been found to be relatively inexpensive and yet possess a high degree of reliability, and is therefore considered to be preferred. It will also be apparent that the system disclosed as the preferred embodiment of the invention provides both audible and visual indications of danger, as well as an indication of the absolute distance to a second vehicle traveling under emergency conditions. It will be readily apparent that only one of the indications described could be utilized in an operative system or, if desired, additional indications could be provided.

Many changes and modifications to the invention will therefore be apparent to those skilled in the art in view of the foregoing description which is intended to be illustrative and not limiting of the invention defined in the appended claims.

What I claim is:
1. A signaling system for indicating that two spaced apart mobile units are within the vicinity of one another comprising:
 (a) first and second signaling devices each carried by a different one of said mobile units;
 (b) each said signaling devices including:
  (1) a transmitter for transmitting signals of a constant power level and selected frequency;

(2) a receiver for receiving signals of said selected frequency and providing an output signal whose energy varies as a function of the energy of the received signal;

(3) a plurality of branch amplifier circuits each having their inputs commonly connected to receive the output signal from said receiver whereby the output signal of said branch amplifier circuits vary as a function of the energy of the received signals;

(4) at least two lamps of different color, each connected to be energized by respective one of said branch amplifier circuits;

(5) said branch amplifier circuits being connected to energize said lamps and characterized by different power gains whereby the number of lamps energized will vary as a function of the power applied to the input of said amplifier means.

2. A signaling system for indicating two spaced apart mobile units that are within the vicinity of one another comprising first and second signaling devices each carried by different one of said mobile units and each of said signaling devices including:

(a) a transmitter for transmitting signals of a constant power level and selected frequency;

(b) a receiver for receiving signals of said selected frequency and providing an output signal whose energy varies as a function of the energy of the received signal;

(c) a plurality of indicating means; and (d) means for selectively energizing said indicating means as a function of said energy produced at the output of said receiver.

3. A signaling system for indicating proximity of mobile units each equipped with first and second signaling devices wherein each of said signaling devices comprises:

(a) an antenna;

(b) a transmitter for transmitting signals of a constant power level and selected frequency;

(c) means connecting the output of said transmitter to said antenna;

(d) a receiver for receiving signals of said selected frequency and providing an output signal whose energy varies as a function of the energy of the received signal;

(e) a transmit-receive switch;

(f) means connecting the input of said receiver to said antenna through said transmit-receive switch;

(g) means for sequentially applying signals to disable said transmitter and said transmit-receive switch;

(h) first, second and third lamps each of different color, said first lamp when lit indicating a safe condition, said second lamp when lit indicating a caution condition, said third lamp when lit indicating a danger condition;

(i) means including a controllable device normally applying power to energize said first lamp;

(j) first amplifier means for energizing said second lamp responsive to the average power output of said receiver attaining a first level; and (k) second amplifier means for energizing said third lamp responsive to the average power output of said receiver attaining a second level.

4. Signaling system as defined in claim 3 including means responsive to said second lamp being energized for operating said controllable device to remove power from said first lamp.

5. A signaling system as defined in claim 3 including an oscillator, a speaker, means including switching device applying the output of said oscillator to said speaker means responsive to said third lamp being energized for controlling said switching means to apply the output of said oscillator to the input of said speaker and thereby provide an audible indication of a danger condition.

6. A signaling system as defined in claim 3 further including a meter, third amplifier means having its input connected to the output of said receiver and its output connected to said meter, said meter being calibrated in accordance with the gain of said third amplifier means and the output power level of said transmitter to indicate the distance to a transmitter whose signal is received by said receiver.

References Cited

UNITED STATES PATENTS

| | | |
|---|---|---|
| 2,157,122 | 5/1939 | Dunmore. |
| 2,403,603 | 7/1946 | Korn. |
| 3,293,600 | 12/1966 | Gifft. |

RODNEY D. BENNETT, *Primary Examiner.*

R. E. BERGER, *Assistant Examiner.*